(12) United States Patent
Burrows et al.

(10) Patent No.: US 8,734,975 B2
(45) Date of Patent: May 27, 2014

(54) MODULAR FLUID TRANSPORT SYSTEM

(75) Inventors: Neil Robert Burrows, West Bloomfield, MI (US); George Albert Garfinkel, Westland, MI (US); Stephen Henry Gunderson, Marine City, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 13/462,859

(22) Filed: May 3, 2012

(65) Prior Publication Data

US 2013/0164593 A1  Jun. 27, 2013

Related U.S. Application Data

(60) Provisional application No. 61/578,845, filed on Dec. 21, 2011.

(51) Int. Cl.
| | |
|---|---|
| *H01M 2/12* | (2006.01) |
| *H01M 10/50* | (2006.01) |
| *H01M 2/04* | (2006.01) |
| *B60K 1/04* | (2006.01) |

(52) U.S. Cl.
CPC .............. *H01M 10/50* (2013.01); *H01M 2/043* (2013.01); *H01M 10/5004* (2013.01); *B60K 1/04* (2013.01); *Y02E 60/12* (2013.01)
USPC ................ 429/88; 428/71; 428/72; 428/120; 428/121; 428/154

(58) Field of Classification Search
CPC ........ B60K 1/04; H01M 10/50; H01M 2/043; H01M 10/5004; Y02E 60/12
USPC .............. 429/72, 88, 120–121, 154, 159–160
See application file for complete search history.

(56) References Cited

U.S. PATENT DOCUMENTS

2012/0043754 A1* 2/2012 Gadawski ..................... 285/189

* cited by examiner

*Primary Examiner* — Patrick Ryan
*Assistant Examiner* — Ben Lewis
(74) *Attorney, Agent, or Firm* — David B. Kelley; Brooks Kushman P.C.

(57) ABSTRACT

A modular thermal management system for a battery in an electric vehicle is provided. In one embodiment, a modular thermal management system for a battery in an electric vehicle is provided. The modular system includes a plurality of manifold segments. Each of the manifold segments further comprises a plurality of fluid ports adapted to connect to a heat exchanger fin for a battery cell. Each manifold segment corresponds to a battery stack comprised of a plurality cells and heat exchanger fins. At least one manifold clip is provided for securing two adjacent manifold segments together. The manifold clip bridges the coupling joint and engages retention features on each of the two manifold segments in order to inhibiting separation longitudinally between the two manifold segments. A plurality of manifold clips are configured to secure a plurality of manifold segments together accommodate a plurality of battery stack configurations.

20 Claims, 4 Drawing Sheets

MODULAR FLUID TRANSPORT SYSTEM

CROSS-REFERENCE TO RELATED APPLICATIONS

This application claims the benefit of U.S. provisional Application No. 61/578,845 filed Dec. 21, 2011, the disclosure of which is incorporated in its entirety by reference herein.

TECHNICAL FIELD

A modular fluid transport system is disclosed for various embodiments of a modular thermal management system for a battery in an electric vehicle.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

The vehicles with batteries may include a cooling system to provide temperature control of the battery, thereby maintaining the charging capacity and extending the battery life, and improving other battery performance characteristics.

SUMMARY

In one embodiment, a modular thermal management system for a traction battery in an electric vehicle is provided. The modular system includes a plurality of manifold segments each having a female end and a male end. The male end is receivable in the female end of an adjacent manifold segment to form a compact coupling joint when two manifold segments are coupled longitudinally. A plurality of retention features are formed along an exterior surface of the manifold segments. At least one retention feature is formed at each of the female end and at the male end. At least one manifold clip is provided for securing two adjacent manifold segments. The manifold clip bridges the coupling joint and engages the retention features on each of the two manifold segments in order to inhibit separation longitudinally between the two manifold segments.

In another embodiment, the plurality of retention features includes a female retention feature being a first undercut recess defined adjacent the coupling joint along the female end of each of the manifold segments and a male retention feature being a second undercut recess defined adjacent the coupling joint along the male end of each of the manifold segments. The manifold clip includes at least two tabs for engaging the first and second undercut recesses to provide a snap-fit for securing the two manifold segments together.

In yet another embodiment, each of the female ends includes a seal.

In a further embodiment, the plurality of retention features includes a female retention feature defined adjacent the coupling joint along the female end of each of the manifold segments and a male retention feature defined adjacent the coupling joint along the male end of each of the manifold segments. Each of the female and male retention features includes a recess extending into the exterior surface of the manifold segments. The recess includes an engagement wall angled to provide a snap-fit with the manifold clip and to prevent disengagement. The female retention feature is a mirror image of the male retention feature.

In another embodiment, the manifold clip includes a central portion and first and second tabs. The central portion of the manifold clip bridges the coupling joint to inhibit bending motion between adjacent manifold segments. The first tab engages the female retention feature and the second tab engages the male retention feature of adjacent manifold segment to inhibit separation of the adjacent manifold segments.

In yet another embodiment, each of the retention features includes an elevated portion that extends above the exterior surface of the manifold segments. The manifold clip further includes at least one anti-rotation claw. The anti-rotation claw engages one of the elevated portions to minimize rotation of the manifold clip with respect to the manifold segments.

In a further embodiment, the modular thermal management system includes an end cap adapted to seal a distal end manifold segment. The end cap is secured to the manifold segment by engaging the one of the retention features.

In another embodiment, each of the manifold segments includes a plurality of fluid ports. Each fluid port is adapted to connect to a heat exchanger fin for a battery cell. each manifold segment corresponds to a battery stack comprised of a plurality cells and heat exchanger fins. A plurality of manifold clips are configured to secure a plurality of manifold segments together to accommodate a plurality of battery stack configurations.

In still another embodiment, a fitting clip for securing one of the manifold segments to a thermal fitting is provided. The fitting clip engages at least one of the retention features to inhibit separation longitudinally between the thermal fitting and the manifold segments.

In another embodiment, the thermal fitting secures the manifold segments to an inlet or an outlet.

In a further embodiment, the thermal fitting is an end-cap for sealing a distal end of one of the manifold segments.

In another embodiment, the fitting clip includes at least one anti-rotation claw.

In yet another embodiment, the plurality of manifold segments forms an upper thermal line and a lower thermal line. One of the upper and lower thermal lines is connected to a fluid inlet and the other of the upper and lower thermal lines is connected to a fluid outlet.

In one other embodiment, a modular fluid circulation system is provided. The fluid circulation system includes a plurality of modular manifold segments. The manifold segments each have a male end with a protrusion and a female end with a receptacle to receive the protrusion of an adjacent manifold segment. The protrusion and receptacle from adjacent manifold segments are coupled together to form a compact coupling joint. A first retention recess is defined adjacent the coupling joint at the female end of each of the manifold segments. A second retention recess is defined adjacent the coupling joint at the male end of each of the manifold segments, wherein the second retention recess is a mirror image of the first retention recess when adjacent segments are coupled together. At least one manifold clip secures adjacent manifold segments in coaxial alignment. The manifold clip has a central portion bridging the coupling joint and at least two tabs for engaging the first and second retention recesses respectively. The manifold clip inhibiting separation longitudinally between adjacent manifold segments. A plurality of manifold clips are configured to secure the plurality of manifold segments together to define a plurality of configurations of modular fluid circulation systems.

In another embodiment, each of first and second the retention recesses includes a pair of recesses extending into an exterior surface of the manifold segments. The pair of recesses are located at diametrically opposed locations along the exterior surface.

In another embodiment, each of the manifold segments includes first and second elevated portions that extend above an exterior surface of the manifold segments adjacent the first and second retention recesses.

In another embodiment, the manifold clip includes at least one anti-rotation claw. The claw engages one of the first and second elevated portions to minimize rotation of the manifold clip with respect to the manifold segments.

In another embodiment, each of the first and second retention recesses includes a front engagement wall angled to provide a snap-fit with the tabs of the manifold clip and to prevent disengagement.

In one other embodiment, a modular fluid circulation system is provided. A plurality of modular manifold segments each have a male end with a protrusion and a female end with a receptacle to receive the protrusion when adjacent manifold segments are coupled together form a compact coupling joint. A seal is disposed along the coupling joint to seal between the adjacent manifold segments when coupled together coaxially. A first undercut recess is defined adjacent the coupling joint along the female end of each of the manifold segments. A second undercut recess is defined adjacent the coupling joint along the male end of each of the manifold segments. At least one manifold clip is provided for securing adjacent manifold segments in coaxial alignment. The manifold clip has at least two tabs for engaging the first and second undercut recesses to provide a snap-fit. The manifold clip is adapted to prevent separation longitudinally the adjacent manifold segments in order to ensure the seal remains sealed between the adjacent manifold segments. A plurality of manifold clips are adapted to secure the plurality of manifold segments together to define a plurality of configurations of modular fluid circulation systems.

In another embodiment, a fitting clip is provided for securing the one of the manifold segments to a fluid component. The fitting clip has at least one tab for engaging at least one of the first and second undercut recesses to secure the fluid component to one of the manifold segments.

The above embodiments and other aspects of the disclosure will be better understood in view of the attached drawings and following detailed description of the illustrated embodiments.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
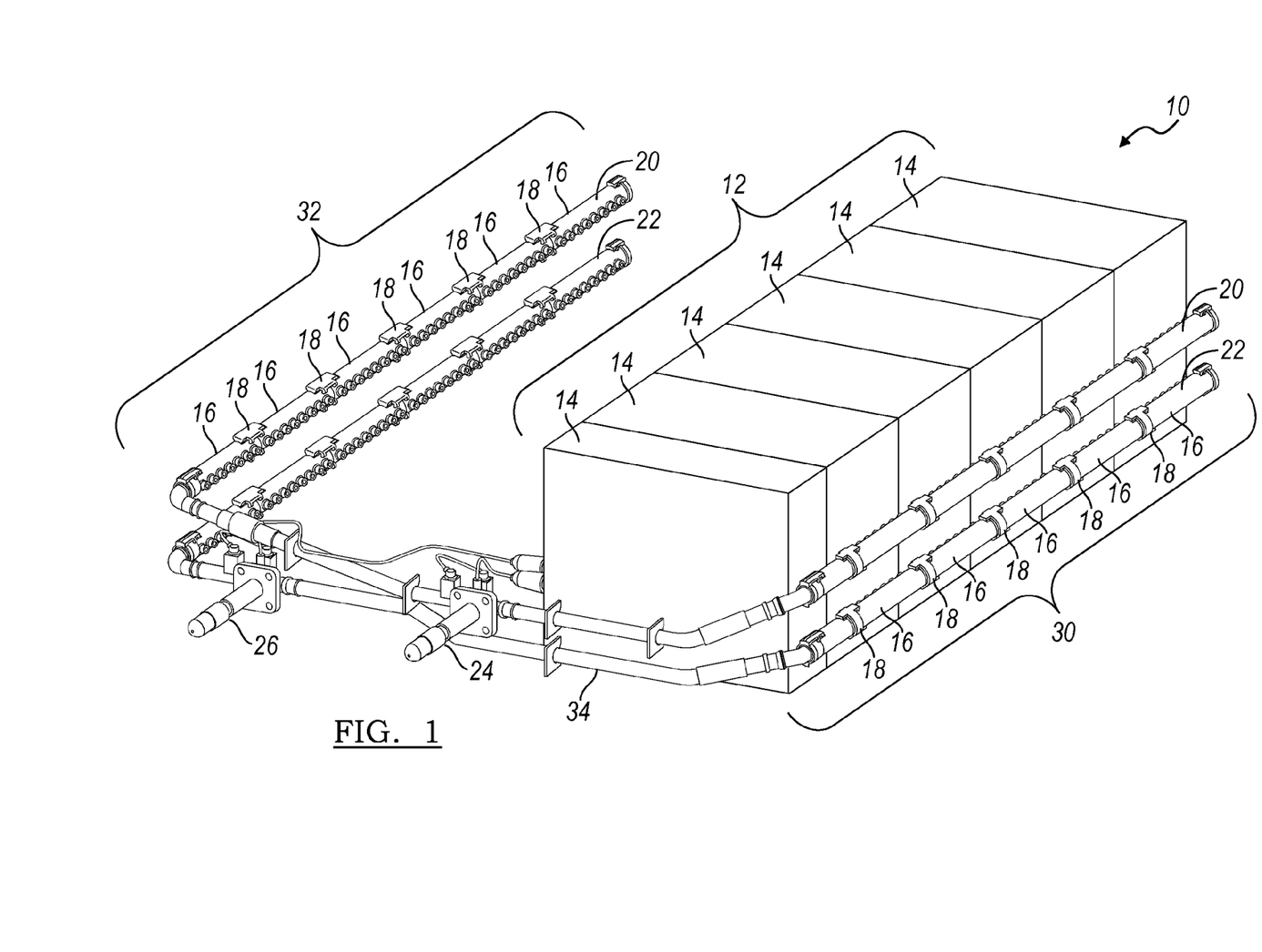
FIG. 1 is a perspective view of a thermal management system according to an embodiment of the present disclosure.

FIG. 1 illustrates a fluid thermal management system 10 for a traction battery 12. The battery 12 may be a battery for a battery-electric vehicle (BEV), a plug-in electric vehicle (PHEV) or a hybrid-electric vehicle (HEV), or any other application requiring thermal management of a modular component, such as a battery.

As illustrated in FIG. 1, the battery 12 is a battery pack having an array of battery modules 14. Each battery module 14 may contain one battery cell or a plurality of battery cells. The battery 12 may be a modular battery adapted to accommodate a multiple of configurations of battery modules 14 connected together to make the different size or capacity batteries 12. Different battery configurations may be required because of packaging constraints in the vehicle, different power requirements in different applications or any combination of variables affecting the size of the battery 12.

The individual battery cells within each battery module 14 are heated and cooled with liquid coolant from the thermal management system 10. The temperature of the battery 12 and of each cell determines the amount of charge that the battery 12 can accept and the amount of charge that can be used when stored in the battery 12. The thermal management system 10 regulates the cell temperatures in order to maintain the battery's useful life, permit a proper charge, and meet vehicle performance attributes. The thermal management system 10 provides heating or cooling via fluid heat transfer for the battery 12. In one embodiment, the thermal management system 10 circulates liquid coolant through cooling channels in heat exchanger fins located adjacent to the cells in the battery 12 to heat or cool the battery 12 using primarily convective heat transfer.

The thermal management system 10 includes a plurality of modular manifold segments 16 which are adapted to connect to each of the cooling channels or heat exchanger fins for each battery cell. The manifold segments 16 may be connected together to accommodate different configurations of batteries 12 and thermal management systems 10. The manifold segments 16 may be sized to accommodate different types of battery modules 14.

The manifold segments 16 may be connected together with manifold clips 18. The manifold segments 16 may be coupled together to form an upper thermal line 20 and a lower thermal line 22. The upper thermal line 20 may be connected to a fluid inlet 24. The lower thermal line 22 may be connected to a fluid outlet 26, or vice versa. The manifold segments 16 may be attached to the battery modules 14. Then, the manifold segments 16 may be connected to each other when the battery modules 14 are connected. It is contemplated that the manifold segments 16 may be formed integrally with the battery modules 14. The manifold segments 16 may also be formed separately from the battery modules 14, but the manifold segments 16 may be packaged as one component with the battery modules 14. In another embodiment, the manifold segments 16 may be coupled to the battery modules 14 after the battery modules 14 are connected to each other.

The thermal management system 10 may accommodate multiple banks of battery packs 12. For example, as illustrated in FIG. 1, the thermal management system 10 may have a first bank 30 and a second bank 32. The first bank 30 and the second bank 32 may be connected with a crossover line 34. As shown in FIG. 1, the fluid inlet 24 and fluid outlet 26 are located along the crossover line 34.

Figure 2:
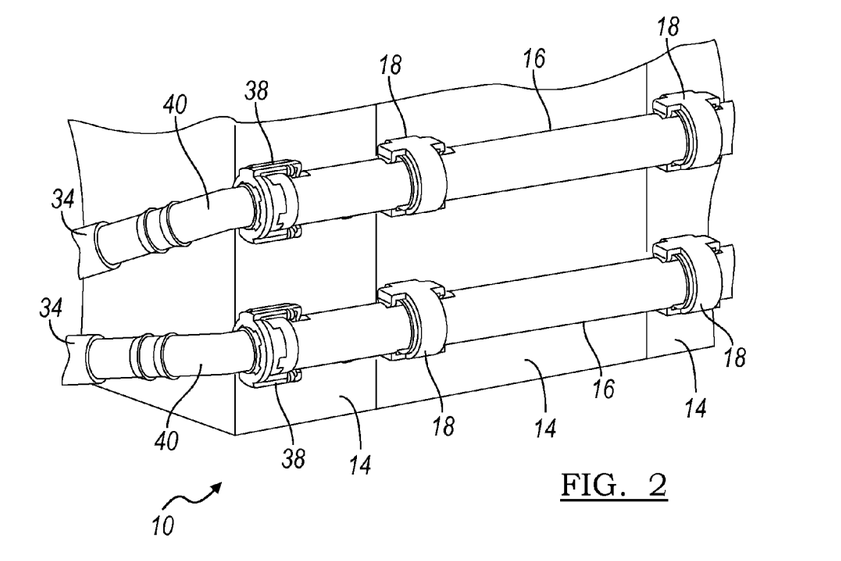
FIG. 2 is a perspective view of a portion of the thermal management system illustrated in FIG. 1.
Figure 3:
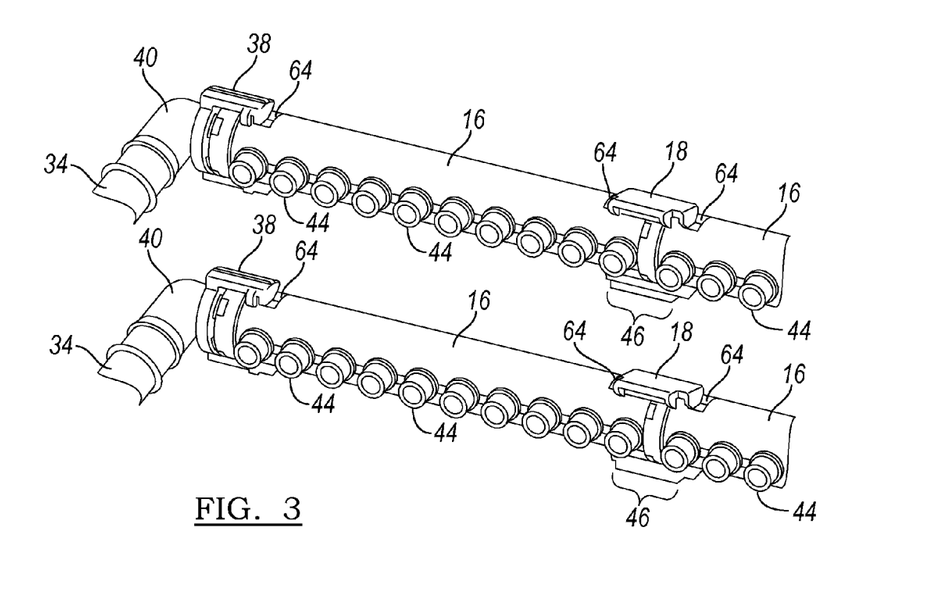
FIG. 3 is another perspective view of a portion of the thermal management system illustrated in FIG. 1.

Referring to FIGS. 2 and 3, a portion of the thermal management system 10 is illustrated that has multiple manifold segments 16 connected by a manifold clips 18. The manifold segments 16 may also be connected to another thermal component with a fitting clip 38. The fitting clip 38 may be used to connect the manifold segments 16 to a component such as a fitting 40 that is connected to the crossover line 34.

Each manifold segment 16 may include a plurality of fluid ports 44, as shown in FIG. 3. The fluid ports 44 are evenly spaced apart and adapted to connect to a cooling channel or heat exchanger fin for each of the battery cells in each battery module 14. Each manifold segment 16 includes the fluid ports 44 that correspond to the heat exchanger fins in each battery module 14. As best shown in FIGS. 2 and 3, each battery module 14 is stacked close to the adjacent battery module 14. In order to maintain the close spacing between the fluid ports 44, the manifold coupling joint 46 must also be very compact. A small coupling joint 46 with compact sealing surfaces between the manifold segments 16 creates a challenge to ensure there are no fluid leaks. For example, in the embodiment illustrated a female end 50 cannot extend into a male end 52 of an adjacent manifold segment 16 without potentially blocking a fluid port 44.

The manifold segments 16 may be formed of plastic, or any other suitable material. The fluid ports 44 may be formed of a rubber, an elastomer or any gasket material for sealing against the cooling channel or heat exchanger fins. The fluid ports maybe over molded or insert molded when the manifold segments 16 are molded of plastic.

Figure 4:
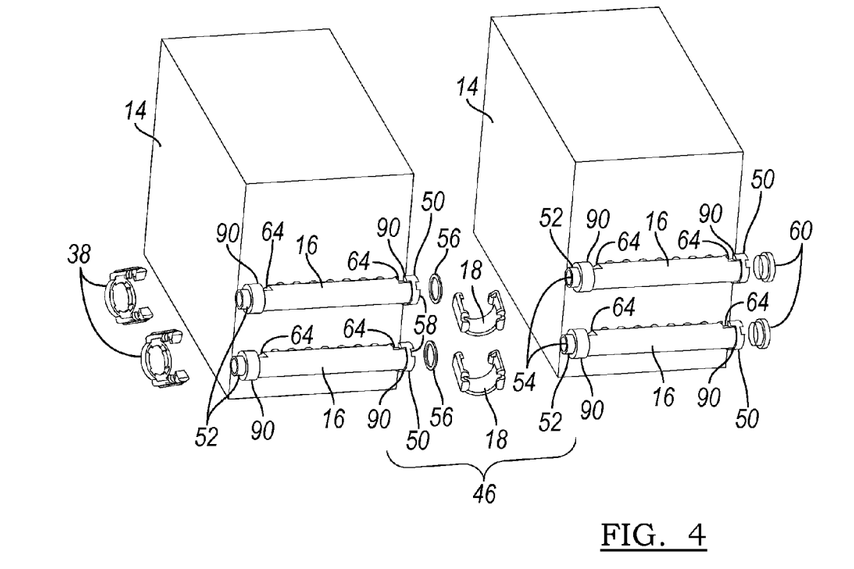
FIG. 4 is an exploded view of a portion of the thermal management system illustrated in FIG. 1.

Referring now to FIG. 4, each manifold segment 16 may have a female coupling end 50 and a male coupling end 52. The male end 52 includes a protrusion 54 which is adapted to be inserted into the opening 58 in female end 50. The male end 52 seals on a grommet or O-ring 56 nested in the opening 58 along the female end 50. While a female-male coupling between the manifold segments 16 is illustrated, other coupling configurations are contemplated. For example, the manifold segments 16 may have distal ends 50, 52 with symmetric coupling features, or any other coupling configuration.

Due to the packaging constraints of the manifold coupling joint 46, there may be only enough space for one O-ring 56. To ensure that there are no fluid leaks, the manifold segments 16 must be constrained so that that the manifold segments 16 do not separate and maintain coaxial alignment so that the one O-ring 56 remains sealed. The manifold coupling joint 46 has only one O-ring 56 and the low ratio of the length of the coupling joint 46 compared to the diameter of the coupling joint 46 makes it more difficult for the manifold segments 16 to self-align as they would in a longer, double O-ring interface.

The manifold clip 18 secures the manifold segments 16 together. The manifold clip 18 limits the manifold segments 16 to separating a minimal distance from each other when the system 10 is pressurized. For example, the manifold clip 18 may keep the manifold segments 16 from moving approximately one millimeter or less in a longitudinal direction when the system 10 is pressurized. The manifold clip 18 also prevents the segments 16 from angular or rotational movement, such as twisting or bending along the coupling joint 46. The manifold clip 18 also ensures the manifold segments 16 are fully engaged with each other when connected coaxially.

Each of the manifold segments 16 includes a plurality of retention features 64 for retaining the manifold clip 18. As better shown in FIGS. 5 through 7, the retention features 64 may include a recess 68 extending into the exterior surface 70 of the manifold segment 16. The retention features 64 may also include an elevated portion 72 that extends above the exterior surface 70 of the manifold segment 16. The retention features 64 may further include a front engagement wall 76. The engagement wall 76 may extend into the recess 68 and may also extend along the elevated portion 72.

Figure 5:
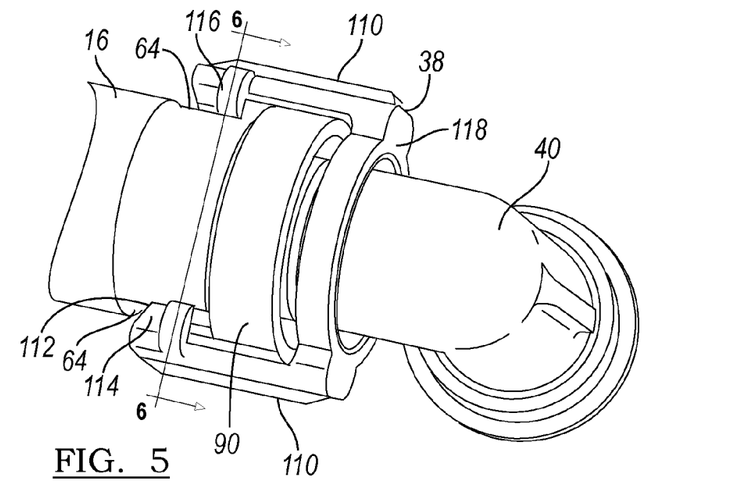
FIG. 5 is a perspective view of a portion of the thermal management system illustrated in FIG. 1.
Figure 6:
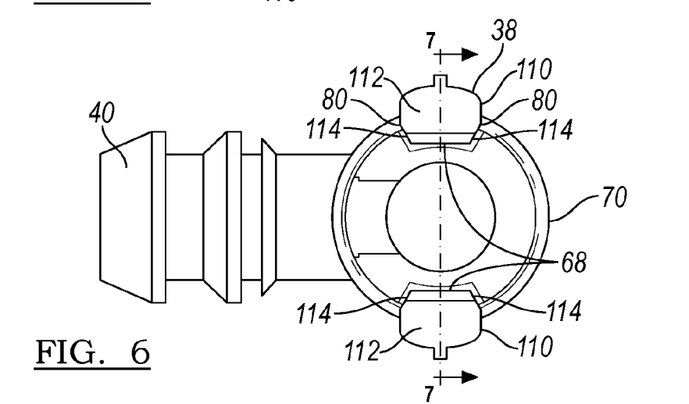
FIG. 6 is a cross-section view of taken along line 6-6 in FIG. 5.
Figure 7:
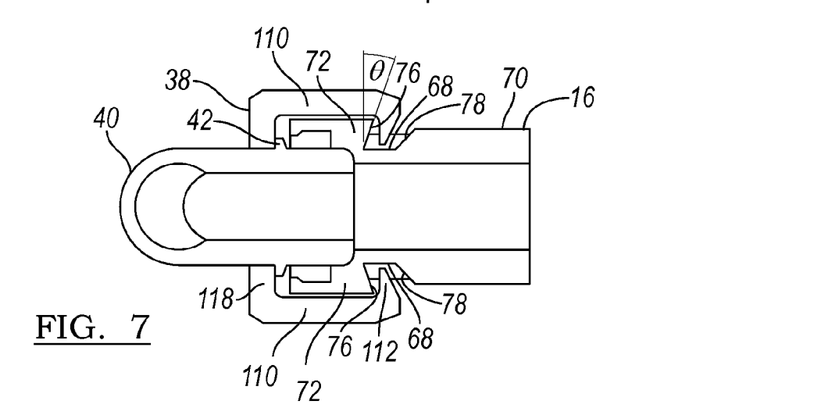
FIG. 7 is a cross-section view of taken along line 6-6 illustrated in FIG. 6.

The retention feature 64 may include an undercut recess 68 with engagement wall 76 formed at an angle that is not perpendicular to the exterior surface 70 in order to provide positive engagement with the manifold clip 18. The positive engagement may be an interference fit such as a snap-fit. The engagement wall 76 may have an angle theta θ from 1° to 5° or any other appropriate angle to allow the manifold clip 18 to snap into place onto each of the manifold segments 16 and to prevent disengagement. The recesses 68 may also include angled sidewalls 80. The retention feature 64 may also include a ramped wall 78 forming a portion of the recess 68. The ramped wall 78 is positioned opposite the engagement wall 76 to facilitate easy coupling of the manifold clip 18.

The retention features 64 may include a pair of recesses 68 located at diametrically opposed locations along the exterior surface 70. The recesses 68 may also be formed as a groove extending along at least a portion of the circumference of the exterior surface 70.

Each manifold segment 16 has at least one retention feature 64 formed at each of the female coupling end 50 and the male coupling end 52. In one embodiment, the retention features 64 at the female end 50 is a mirror image of the retention feature at the male end 52. In the embodiment illustrated in the Figures, the engagement features is oriented so that the engagement wall 76 and elevated portion 72 are disposed closer to the distal ends 50, 52 than the ramped wall 78. In one embodiment, the manifold segment 16 include a shoulder portion 90 adjacent the distal ends 50, 52. The retention features 64 at the female end 50 and male end 52 are equally spaced from the shoulder portion 90. In another embodiment, the elevated portion 72 may be formed as part of the shoulder portion 90 and extend around the circumference of the manifold segment 16. The retention features 64 may be positioned symmetrically from a central axis of the manifold segment. The shoulder portion 90 is located along each of the distal ends of the manifold segments 16. The shoulder portion 90 abuts the shoulder portion 90 of an adjacent manifold segment 16 when the manifold segments 16 are coupled together.

Figure 8:
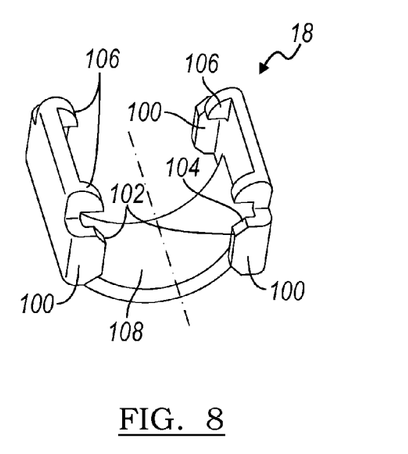
FIG. 8 is a perspective view of a component of the thermal management system illustrated in FIG. 1.
Figure 9:
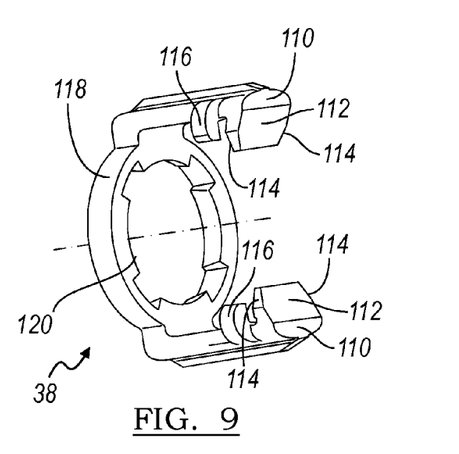
FIG. 9 is a perspective view of another component of the thermal management system illustrated in FIG. 1.

The retention features 64 are configured to be engaged by several clips, including a manifold clip 18 and a fitting clip 38, shown in FIGS. 8 and 9 respectively. The clips 18, 38 may be formed of plastic so that the clips 18, 38 can be resiliently coupled to the manifold segments 16. For example, the clips 18, 38 may have an interference fit or snap-fit, with the retention features 64 on the manifold segments 16. Alternatively, the clips 18, 38 may be formed of stamped metal or any other material which allows the clips 18, 38 to be quickly connected to the manifold segments 16 with positive retention.

Looking first at the manifold clip 18 in FIG. 8, the manifold clip 18 may include a plurality of retention tabs 100 to prevent axial separation of the manifold segments 16. In one embodiment, the manifold clip 18 includes at least one tab 100. The tabs 100 may include a tooth 102. The tooth 102 may be angled to match the angle of the engagement wall 76 in the retention feature 64 in order to provide positive retention and greater engagement. The tooth 102 may include a pair of angled sidewalls 104. The sidewalls 104 may be angled to match the angle of the sidewalls 80 in the recesses 68.

As illustrated in FIG. 8, the manifold clip 18 includes a plurality of tabs 100. The tabs 100 may engage in a pair of retention features 64 located at diametrically opposed locations along the manifold segment 16. In another embodiment, the retention features may include a recess 68 formed as a groove and the tabs 100 may engage the groove at multiple locations.

The manifold clip 18 may also include an anti-rotation claw 106. The anti-rotation claw 106 may extend in a direction generally perpendicular in relation to the retention tab 100. The anti-rotation claw 106 may engage an interface surface to minimize rotation of the manifold clip 18 with respect to the manifold segments 16. As illustrated in FIG. 5, the manifold clip 18 includes a plurality of anti-rotation claws 106. In one embodiment, the anti-rotation claw 106 engages an anti-rotation interface surface formed along the elevated portion 72. The anti-rotation interface surface may be formed generally perpendicular to the engagement wall 76. The anti-rotation claws 106 may engage the retention feature 64 at multiple locations in order to prevent rotation of the manifold clip 18 in at least two directions.

The manifold clip 18 may also include a connection portion 108 for connecting the plurality of tabs 100 and the plurality of anti-rotation claws 106. The connection portion 108 may have an arc shape to extend around a portion of the circumference of the manifold segment 16. It is also contemplated that the connection portion 108 may have a rectangular shape or other shapes that corresponds to the shape of the exterior surface 70 of the manifold segment 16.

Turning now to the fitting clip 38 illustrated in FIG. 9, the fitting clip 38 may also include a plurality of retention tabs 110. The tabs 110 may include a tooth 112 at a distal end of the tab 110. The tooth 112 may be angled to match the angle of the engagement wall 76 in the retention feature 64 in order to provide positive retention and greater engagement. The tooth 40 may include a pair of angled sidewalls 114. The sidewalls 114 may be angled to match the angle of the sidewalls 80 in the recesses 68.

As illustrated in FIG. 9, the fitting clip 38 includes at least two tabs 110. The tabs 110 may engage the pair of retention features 64 located at diametrically opposed locations along the manifold segment 16.

The fitting clip 38 may also include an anti-rotation claw 116. The anti-rotation claw 116 may extend in a direction generally perpendicular in relation to the retention tab 110. The anti-rotation claw 116 may engage an interface surface to minimize rotation of the fitting clip 38 with respect to the manifold segments 16. As illustrated in FIG. 5, the fitting clip 38 includes at least two anti-rotation claws 116. In one embodiment, the anti-rotation claw 116 engages an anti-rotation interface surface formed along the elevated portion 72. The anti-rotation interface surface may be formed generally perpendicular to the engagement wall 76. The anti-rotation claw 116 may only extend from one side of the tab 110. The anti-rotation claws 116 may engage the retention feature 64 at multiple locations in order to prevent rotation of the fitting clip 38 in at least two directions.

The fitting clip 38 may also include connection portion 118 connecting the tabs 110 and for coupling the fitting clip 38 to another component. For example, as illustrated in FIG. 7, the connection portion 118 may fit around a fitting 40 to couple the fitting 40 to the manifold segment 16. The fitting 40 may have a flange 42 which extends from the fitting 40 and has an outer diameter which is larger than the inner diameter 120 of the fitting clip 38.

The connection portion 118 may also be adapted to fit around a component such as an end cap 60, shown in FIG. 4. The connection portion 118 may have a circular shape to extend around the diameter of the fitting 40 or end cap 60. It is also contemplated that the connection portion 118 may have a rectangular shape or any other shape that corresponds to the shape of a component to be coupled to the manifold segments 16. The connection portion 118 may be a circular opening, as illustrated, to allow the component to rotate with respect to the fitting clip 38. However, the connection portion 118 may also be formed as one-piece with the component, such as the fitting 40 or the end cap 60.

FIG. 6 and FIG. 7 illustrate cross-sectional views of the clip 38 engaged with the retention feature 64 formed in the manifold segments 16. While the cross-sections are illustrated along a fitting clip 38 in FIG. 5, it should be understood that the cross-section for a manifold clip 18 engaged with the retention feature 64 would be substantially the same.

Since the retention features 64 are uniformly shaped along the manifold segments 16, and a number of manifold segments 16 may be coupled together with manifold clips 18 to fit different thermal management system 10 configurations. It should also be understood that the fitting clips 38 are adapted to fit the same retention features 64 as the manifold clips 18. Therefore, the thermal management system 10 may be easily adapted to fit different battery 12 sizes and configurations.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular thermal management system for a traction battery in an electric vehicle, the thermal management system comprising:

a plurality of manifold segments each having a female end and a male end, the male end receivable in the female end of an adjacent manifold segment to form a compact coupling joint when two manifold segments are coupled longitudinally;

a plurality of retention features formed along an exterior surface of the manifold segments, at least one retention feature formed at each of the female end and at the male end, wherein each of the retention features includes an elevated portion that extends above the exterior surface of the manifold segments; and at least one manifold clip for securing two adjacent manifold segments, the manifold clip bridging the coupling joint and engaging the retention features on each of the two manifold segments, thereby inhibiting separation longitudinally between the two manifold segments, wherein the manifold clip includes at least one anti-rotation claw, the anti-rotation claw engaging one of the elevated portions to minimize rotation of the manifold clip with respect to the manifold segments.

2. The modular thermal management system of claim 1 wherein the plurality of retention features comprises a female retention feature being a first undercut recess defined adjacent the coupling joint along the female end of each of the manifold segments and a male retention feature being a second undercut recess defined adjacent the coupling joint along the male end of each of the manifold segments; and the manifold clip includes at least two tabs for engaging the first and second undercut recesses to provide a snap-fit for securing the two manifold segments together.

3. The modular thermal management system of claim 2, wherein the manifold clip includes at least one anti-rotation claw extending transverse to at least one of the two tabs, the anti-rotation claw engaging a retention feature formed on the manifold segments to minimize rotation of the manifold clip with respect to the manifold segments.

4. The modular thermal management system of claim 1 wherein each of the female ends includes a seal.

5. The modular thermal management system of claim 1 wherein the plurality of retention features comprises a female retention feature defined adjacent the coupling joint along the female end of each of the manifold segments and a male retention feature defined adjacent the coupling joint along the male end of each of the manifold segments; and wherein each of the female and male retention features including a recess extending into the exterior surface of the manifold segments, the recess including an angled engagement wall, the female retention feature being a mirror image of the male retention feature.

6. The modular thermal management system of claim 5 wherein the manifold clip includes a central portion and first and second tabs, the central portion bridging the coupling joint to inhibit bending motion between adjacent manifold segments and the first tab engaging the female retention feature and the second tab engaging the male retention feature of adjacent manifold segment to inhibit separation of the adjacent manifold segments.

7. The modular thermal management system of claim 1 further comprising an end cap adapted to seal a distal end manifold segment, the end cap secured to the manifold segment by engaging the one of the retention features.

8. The modular thermal management system of claim 1 wherein each of the manifold segments further comprises a plurality of fluid ports, each fluid port adapted to connect to a heat exchanger fin for a battery cell, wherein each manifold segment corresponds to a battery stack comprised of a plurality of cells and heat exchanger fins, wherein a plurality of manifold clips are configured to secure a plurality of manifold segments together accommodate a plurality of battery stack configurations.

9. The modular thermal management system of claim 1 further comprising a fitting clip for securing one of the manifold segments to a thermal fitting, the fitting clip engaging at least one of the retention features to inhibit separation longitudinally between the thermal fitting and the manifold segments.

10. The modular thermal management system of claim 9 wherein the thermal fitting secures the manifold segments to at least one of an inlet and an outlet.

11. The modular thermal management system of claim 9 wherein the thermal fitting is an end-cap for sealing a distal end of one of the manifold segments.

12. The modular thermal management system of claim 9 wherein the fitting clip includes at least one anti-rotation claw.

13. The modular thermal management system of claim 1 wherein the plurality of manifold segments forms an upper thermal line and a lower thermal line, one of the upper and lower thermal lines connected to a fluid inlet and the other of the upper and lower thermal lines connected to a fluid outlet.

14. A modular fluid circulation system comprising:
a plurality of modular manifold segments each having a male end with a protrusion and a female end with a receptacle to receive the protrusion of an adjacent manifold segment, wherein the protrusion and receptacle from adjacent manifold segments are coupled together to form a compact coupling joint;
a first retention recess defined adjacent the coupling joint at the female end of each of the manifold segments;
a second retention recess defined adjacent the coupling joint at the male end of each of the manifold segments, wherein the second retention recess is a mirror image of the first retention recess when adjacent segments are coupled together; and
at least one manifold clip for securing adjacent manifold segments in coaxial alignment, the manifold clip having a central portion bridging the coupling joint and at least two tabs for engaging the first and second retention recesses respectively, the manifold clip thereby inhibiting separation longitudinally between adjacent manifold segments,
wherein a plurality of manifold clips are configured to secure the plurality of manifold segments together to define a plurality of configurations of modular fluid circulation systems, wherein each of the manifold segments further comprises first and second elevated portions that extends above an exterior surface of the manifold segments adjacent the first and second retention recesses.

15. The modular fluid circulation system of claim 14 wherein each of the first and second retention recesses comprises a pair of recesses extending into an exterior surface of the manifold segments, the pair of recesses located at diametrically opposed locations along the exterior surface.

16. The modular fluid circulation system of claim 14 wherein the manifold clip further comprises at least one anti-rotation claw extending transverse to at least one of the two tabs for engaging one of the first and second elevated portions to minimize rotation of the manifold clip with respect to the manifold segments.

17. The modular fluid circulation system of claim 14 wherein each of the first and second retention recesses further comprises a front engagement wall angled to provide a snap-fit with the tabs the manifold clip.

18. A modular fluid circulation system comprising:
a plurality of modular manifold segments each having a male end with a protrusion and a female end with a receptacle to receive the protrusion when adjacent manifold segments are coupled together form a compact coupling joint;
a seal disposed along the coupling joint to seal between the adjacent manifold segments when coupled together coaxially;
a first undercut recess defined adjacent the coupling joint along the female end of each of the manifold segments;
a second undercut recess defined adjacent the coupling joint along the male end of each of the manifold segments; and
at least one manifold clip for securing adjacent manifold segments in coaxial alignment, the manifold clip having at least two tabs for engaging the first and second undercut recesses to provide a snap-fit, wherein the manifold clip is adapted to prevent separation longitudinally the adjacent manifold segments thereby ensuring the seal remains sealed between the adjacent manifold segments, wherein the manifold clip includes at least one anti-rotation claw extending transverse from at least one of the two tabs, the anti-rotation claw engaging a retention feature formed on the manifold segments to minimize rotation of the manifold clip with respect to the manifold segments, wherein a plurality of manifold clips are adapted secure the plurality of manifold segments together to define a plurality of configurations of modular fluid circulation systems.

19. The modular fluid circulation system of claim 18 further comprising a fitting clip for securing the one of the manifold segments to a fluid component, the fitting clip having at least one tab for engaging at least one of the first and second undercut recesses to secure the fluid component to one of the manifold segments.

20. The modular fluid circulation system of claim 18 further comprising at least one retention feature formed at each of the female end and at the male end along an exterior surface of the manifold segments, wherein each of the retention features includes an elevated portion that extends above the exterior surface of the manifold segments; and wherein the at least one anti-rotation claw, engages one of the elevated portions to minimize rotation of the manifold clip with respect to the manifold segments.

* * * * *